(No Model.)

J. F. FAHS.
OATMEAL CUTTER.

No. 264,449. Patented Sept. 19, 1882.

WITNESSES
F. L. Durand
Geo. M. Finckel

INVENTOR.
Joseph F. Fahs.
by Wm. N. Finckel
his Attorney.

UNITED STATES PATENT OFFICE.

JOSEPH F. FAHS, OF AKRON, OHIO.

OATMEAL-CUTTER.

SPECIFICATION forming part of Letters Patent No. 264,449, dated September 19, 1882.

Application filed April 6, 1882. (No model.)

*To all whom it may concern:*

Be it known that I, JOSEPH F. FAHS, a citizen of the United States, residing at Akron, in the county of Summit and State of Ohio, have invented certain new and useful Improvements in Oatmeal-Cutters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention is in the nature of improvements in machinery for reducing oats to the condition of oatmeal, which machinery is also applicable for similarly treating other cereals.

The improvements consist in the combination, with a rotary discous grain-carrier, of normally-stationary circular knives, preferably provided with a bevel on one edge only, hugging the sides of the disks of the carrier and acting with a shear cut upon the grain in the carrier; also, in the combination, with the circular knives, of means to rotate them and means to sharpen said knives as they become dull; and also such a construction and arrangement of the discous feeder and knives as to permit their reversal as their contact-surfaces become worn, all substantially as hereinafter specified and claimed.

Figure 1:
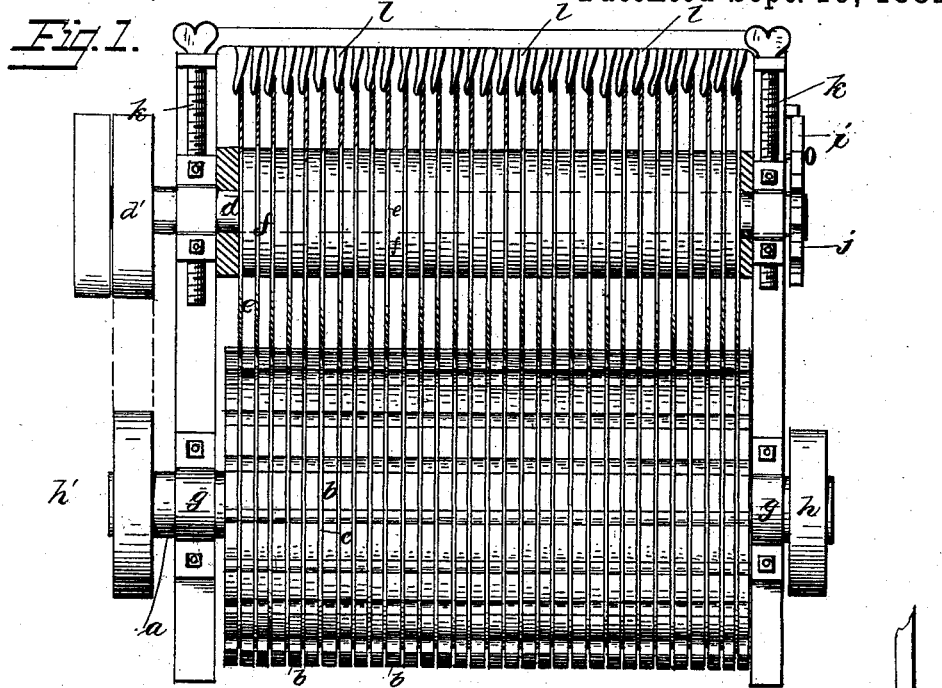
Figure 2:
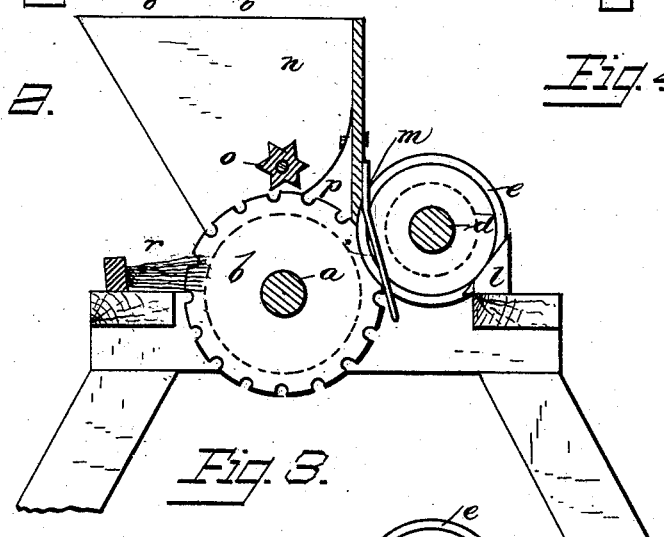
Figure 4:
Figure 3:
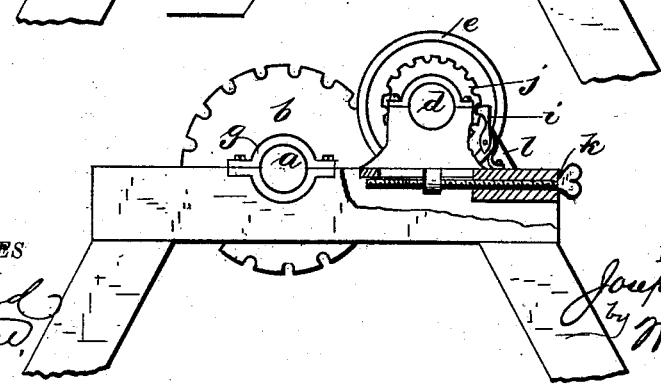

In the accompanying drawings, in the several figures of which like parts are similarly designated, Figure 1 is a top plan view of my apparatus with the hopper and its contained parts removed. Figure 2 is a vertical longitudinal section thereof, with the hopper and its appurtenances in place. Fig. 3 is a side elevation of the same, with the hopper and its appurtenances removed, and showing a slightly-different arrangement of means for adjusting the knives, the framing being partly broken away to aid the view, and the driving-pulley being omitted; and Fig. 4 is an enlarged view of the meeting edges of the knives and carrier.

The use of circular knives and discous grain-carriers in this class of machinery is old; but, so far as I am aware, they have been simultaneously rotated, but in opposite directions. My investigations have developed the fact that the best results are obtainable by rotating the carrier in contact with stationary circular knives. Hence in making my improved machinery I key or otherwise attach to a rotary shaft, $a$, a number of disks, $b$, alternating with washers $c$ of less diameter, and upon another but stationary shaft, $d$, I secure a series of circular knives, $e$, separated by washers $f$, the edges of which knives are beveled, preferably on one side, but, if desirable, beveled on both sides, or brought to a sharp V-edge. These beveled-edge knives enter the spaces of the washers between the disks, and if beveled on one side only the flat side closely hugs the side or face of the disks, as shown in detail in Fig. 4. The shaft $a$ is arranged in any well-known divided or easily-separable bearings or housings $g$ on a suitable frame-work for the machinery, and said bearings may be the ordinary two-part boxes, the upper members of which are removable or detachable to permit the insertion and the removal of the shafts. The shaft is provided with a power-receiver, as a pulley or band-wheel, $h$. The disks $b$ on this shaft have notched peripheries, and said disks are so arranged upon their shaft $a$ as that their notches will be in alignment. By this arrangement the notches form cavities across the series of disks to receive, hold, and advance the grain to the knives, all as in former similar machines. It will be understood that in operation this grain-carrier has a continuous rotary motion. The shaft $d$ is also placed in separable bearings, similar to the bearings $g$ of shaft $a$, and is held from rotation by only suitable mechanism—as, for instance, a pawl and ratchet, $i\,j$, the former being on the framing and the latter on the shaft. By means of this pawl-and-ratchet detent the knives are held with any given portion of their circumference in contact with the discous carrier. Hence as said knives are dulled or worn a new surface may be presented by disconnecting the pawl and turning the shaft the distance of a tooth or two of the ratchet. The proximity of the knives to the carrier may be regulated—as, for instance, to compensate for wear—by mounting the bearings upon adjusting-screws $k$ of suitable arrangement, two such arrangements being shown, one in Fig. 1, where the bearings are fixed to screws arranged in sockets above the frame, and the other in Fig. 3, where the bearings have lugs projecting through slots in the frame, and the screws arranged in sockets beneath the frame; but these and others equivalent thereto being perfectly obvious, need no specific description here.

In order to keep the cutting-edges of the knives sharp, I provide rifles, "steels," or other grinding means adjacent thereto as a part of the machine, so as to admit of the expeditious resharpening of the knives without removal from the machine, and hence saving loss of time and dismantling of the machine. These sharpening devices are preferably pieces of emery or chilled iron $l$, Fig. 1, arranged on the frame-work at the rear of the knives, and so as to bear upon their beveled edges at the proper angle, or they may be a continuous strip of emery, stone, or metal grooved or corrugated to receive the knives, as at $l$, Figs. 2 and 3. When the knives require sharpening the pawl is disconnected from the ratchet and hand or other power applied to the knife-shaft to revolve it, whereby the surfaces of the knives are carried by upon the emery and re-edged.

The shaft $d$ may be driven intermittently to present fresh edges of the knives, or continuously to sharpen them by power connection with a pulley, $h'$, on a shaft, $a$, and a belt and fast and loose pulleys $d'$ on shaft $d$. Instead of a fast and loose pulley a pulley and clutch mechanism may be used. When sufficiently sharpened the pawl is again connected with the ratchet, so as to hold the knives stationary.

Fingers $m$, as of sheet metal, are arranged between the knives to prevent the accumulation of flour or grain, and such fingers may project downwardly from the side of the hopper $n$. The hopper $n$ is removably attached to the frame-work of the machinery, so as to permit easy access to any part thereof. The hopper $n$ contains a rotary corrugated cylinder, $o$, which may be designated an "agitator" or "leveler," its office being to insure the feeding of the grain to the grain-carrier, composed of the notched disks, as hereinbefore described. In order to facilitate this feeding or delivery of the grain the lower part of the hopper is preferably provided with a slanting, inclined, or curved casting or block, $p$, serving as a directing-auxiliary of the agitator or leveler $o$. The agitator $o$ may obtain its motion from the carrier-shaft by belting or gearing. At each adjustment of the knives by means of the pawl and ratchet the knives are moved about one-quarter inch, and every such movement brings the knives over the sharpening-surfaces; but when the knives become very dull their shaft should be rotated, as before stated. The action of the knives upon the grain fed thereto is by a clear, sharp shear cut—the most effective known in this class of machines.

When by long use the contact-edges of the disks and knives become worn, and hence untrue, the bearings of the shafts of either one or the other may be separated, and the gang of knives or the carrier may be reversed without the trouble, labor, and delay of reversing each individual knife or carrier-disk.

As an auxiliary to or substitute for the fingers $m$, I may provide a brush, $r$, of steel wire or other material placed back of the grain-carrier to keep the grooves of the grain-carrier clean of flour, so that the cutting operation of the knives will not be interfered with. This brush is stationary.

In order to increase the capacity of my machine, I may duplicate the grain-carriers, arranging one on each side the stationary knives and suitably varying the adjusting-screws of the knives.

What I claim is—

1. An oatmeal cutter or machine provided with a rotary grain-carrier and a gang or series of circular knives normally stationary, but rotatable at pleasure to present fresh cutting-edges to the carrier.

2. The combination, in a machine for cutting oats, substantially as shown and described, of a rotary discous grain-carrier and adjustable circular knives normally stationary, up to which the grain is brought by the discous carrier and by which the grain is cut with a sharp shear cut.

3. The circular knives, their shaft, and a detent to hold stationary or release the same, combined with means to rotate said knives to admit of their being sharpened, substantially as shown and described.

4. The circular knives and their shaft held normally stationary, but adapted to be rotated, combined with means to rotate the same, and the sharpening devices $l$, arranged upon the frame-work of the machine in the rear of the knives, one for each knife, substantially as shown and described.

5. The combination, substantially as shown and described, of the rotary grain-carrier, the stationary circular knives and their shaft, with a pawl and ratchet to admit of the adjustment of the knives to present new cutting-surfaces to the carrier.

6. The discous feeder and the circular knives, in combination with movable or separable bearings, whereby either may be reversed to present new contact-surfaces, as specified.

In testimony whereof I affix my signature in presence of two witnesses.

JOSEPH F. FAHS.

Witnesses:
N. C. BARTON,
JOHN HEFFELMAN.